(12) United States Patent
Chin

(10) Patent No.: US 10,978,220 B2
(45) Date of Patent: *Apr. 13, 2021

(54) FLEX FLAT CABLE STRUCTURE AND FLEX FLAT CABLE ELECTRICAL CONNECTOR FIX STRUCTURE

(71) Applicant: ENERGY FULL ELECTRONICS CO., LTD., New Taipei (TW)

(72) Inventor: Hsu-Shen Chin, New Taipei (TW)

(73) Assignee: ENERGY FULL ELECTRONICS CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,272

(22) Filed: Oct. 7, 2019

(65) Prior Publication Data

US 2020/0035379 A1 Jan. 30, 2020

Related U.S. Application Data

(63) Continuation of application No. 15/241,074, filed on Aug. 19, 2016, now Pat. No. 10,483,015.
(Continued)

(51) Int. Cl.
| | |
|---|---|
| *H01B 7/08* | (2006.01) |
| *H01R 13/66* | (2006.01) |
| *H01B 7/42* | (2006.01) |
| *H01B 3/18* | (2006.01) |
| *H01B 7/02* | (2006.01) |

(Continued)

(52) U.S. Cl.
CPC ............ *H01B 7/0823* (2013.01); *H01B 3/18* (2013.01); *H01B 7/0216* (2013.01); *H01B 7/0225* (2013.01); *H01B 7/04* (2013.01); *H01B 7/1805* (2013.01); *H01B 7/426* (2013.01); *H01B 9/003* (2013.01); *H01B 9/028* (2013.01); *H01R 12/777* (2013.01); *H02G 15/076* (2013.01); *H01B 7/184* (2013.01); *H01R 12/62* (2013.01)

(58) Field of Classification Search
CPC ............................... H01B 7/08; H01R 13/665
USPC ......................................... 174/117 F, 117 FF
See application file for complete search history.

(56) References Cited

U.S. PATENT DOCUMENTS

| | | |
|---|---|---|
| 4,468,089 A | 8/1984 | Brorein |
| 4,475,006 A | 10/1984 | Olyphant, Jr. |

(Continued)

FOREIGN PATENT DOCUMENTS

| | | |
|---|---|---|
| CN | 101499568 A | 8/2009 |
| TW | 559316 U | 10/2003 |

(Continued)

*Primary Examiner* — Chau N Nguyen
(74) *Attorney, Agent, or Firm* — Hauptman Ham, LLP

(57) ABSTRACT

A flex flat cable (FFC) structure includes metallic transmission wires arranged in parallel, first insulating jackets, and second insulating jacket. The metallic transmission wires includes one or more power wires and signal wires. The power wire is configured to transmit power. The signal wires are configured to transmit a data signal. Each of first insulating jackets encloses one of metallic transmission wires. The second insulating jacket surrounds the first insulating jackets. An embossment pattern is arranged on an external surface of the second insulating jacket. The embossment pattern includes meander lines in a top-view direction and in an extending direction for the metallic transmission wires. The meander lines are not arranged parallel.

1 Claim, 3 Drawing Sheets

Related U.S. Application Data

(60) Provisional application No. 62/250,837, filed on Nov. 4, 2015.

(51) Int. Cl.
  *H01B 7/04* (2006.01)
  *H01B 7/18* (2006.01)
  *H01B 9/00* (2006.01)
  *H01B 9/02* (2006.01)
  *H01R 12/77* (2011.01)
  *H02G 15/076* (2006.01)
  *H01R 12/62* (2011.01)

(56) References Cited

U.S. PATENT DOCUMENTS

| | | | |
|---|---|---|---|
| 4,518,209 A * | 5/1985 | Negley | H01R 13/658 |
| | | | 439/92 |
| 5,038,834 A | 8/1991 | Siegfried | |
| 5,360,944 A | 11/1994 | Springer et al. | |
| 6,740,808 B1 | 5/2004 | Chang | |
| 6,744,051 B2 | 6/2004 | Maydanich et al. | |
| 6,781,061 B2 | 8/2004 | Tanaka | |
| 7,066,246 B2 | 6/2006 | Pauchet et al. | |
| 7,758,374 B2 | 7/2010 | Yu et al. | |
| 7,956,290 B2 | 6/2011 | Wang | |
| 8,362,359 B1 | 1/2013 | Laws et al. | |
| 8,404,976 B2 | 3/2013 | Telley et al. | |
| 8,575,490 B2 | 11/2013 | Siahaan et al. | |
| 9,053,836 B2 | 6/2015 | Yagi | |
| 10,483,015 B2 * | 11/2019 | Chin | H01B 7/426 |
| 2004/0248470 A1 * | 12/2004 | Wu | H01R 12/716 |
| | | | 439/637 |
| 2013/0105194 A1 | 5/2013 | Yagi | |
| 2015/0311643 A1 | 10/2015 | Gundel et al. | |

FOREIGN PATENT DOCUMENTS

| | | |
|---|---|---|
| TW | 200908025 A | 2/2009 |
| TW | 201209852 A1 | 3/2012 |

* cited by examiner

FLEX FLAT CABLE STRUCTURE AND FLEX FLAT CABLE ELECTRICAL CONNECTOR FIX STRUCTURE

CROSS REFERENCE TO RELATED APPLICATIONS

This application is a continuation application of U.S. Ser. No. 15/241,074, filed on Aug. 19, 2016, which claims priority of U.S. Provisional Application Ser. No. 62/250,837 filed on Nov. 4, 2015. The entire disclosures of each of the above applications are incorporated herein by reference.

BACKGROUND

1. Field of the Invention

The present disclosure relates to a flex flat cable (FFC) structure, and more particularly, to an FFC structure having a surface where an embossment pattern is formed.

2. Description of the Prior Art

A flex flat cable (FFC) is a new type data line cable. The FFC is fabricated by an insulating material and a highly thin, flat tinned copper wire after the insulating material and the flat tinned copper wire are compressed in an automation device. A core is neatly arranged in the FFC, largely transmitted, structurally flat, compact in size, dismantled easily, and flexible so the FFC can be applied to all kinds of electronic products easily and flexibly. So the FFC as a data transmission cable is especially suitable for different high frequency bending conditions such as the connection of mobile components. The FFC can be plugged onto with a connector or directly welded on a printed circuit board (PCB).

The electronic products are designed to be compact in the modern tendency so the size of the cable used in the electronic products needs to be narrowed as well. The insulating material fabricating the conventional FFC is polyethylene terephthalate (PET). Although PET costs less and is easy to be compressed, the dielectric constant of PET and the dielectric dissipation factor of PET are greater. Besides, the resistance of the flat copper wire is greater under the limit of impedance specifications so the FFC is not beneficial to transmitting a high-speed data signal for a long distance. But, it should be taken into consideration that high costs and the difficulty in compression if other insulating material is substituted for the FFC. Besides, the thickness of a power flat copper wire and the thickness of a signal flat copper wire used in the conventional compression FFC is the same in specifications. When the power and the high-speed data signal are transmitted through the FFC at the same time, the thickness of the flat copper wire needs to match the specifications of the impedance. Under the limit of the specifications of the impedance, it is necessary to increase the quantity or width of the flat copper wire to enhance the withstanding current capability to conform to the specifications of the power. However, the increase in the quantity or width of the flat copper wire is disadvantageous of narrowing the size of the FFC.

Therefore, it is necessary and important to design a new FFC structure with which the high-speed data signal is transmitted longer and with which the size of the FFC becomes narrower more easily.

SUMMARY

An object of the present disclosure is to propose a flex flat cable (FFC) structure and an FFC electrical connector fix structure to solve the technical problems that the transmission distance of a high-speed data signal in the FFC structure is obviously shorter and that it is a bit hard to narrow the size of the FFC.

According the present disclosure, a flex flat cable (FFC) structure includes: a plurality of metallic transmission wires, arranged parallel, comprising one or more power wires and a plurality of signal wires; the power wire being configured to transmit power; the plurality of signal wires being configured to transmit a data signal; a plurality of first insulating jackets, and each of the plurality of first insulating jackets encloses one of the plurality of metallic transmission wires; a second insulating jacket, surrounding the plurality of first insulating jackets; an embossment pattern being arranged on an external surface of the second insulating jacket; the embossment pattern comprising a plurality of meander lines in a top-view direction and in an extending direction for the plurality of metallic transmission wires; the plurality of meander lines being not arranged parallel.

In one aspect of the present disclosure, the FFC structure further includes a third insulating jacket, enclosing the plurality of first insulating jackets and being enclosed by the second insulating jacket.

In another aspect of the present disclosure, materials of the first insulating jacket, the second insulating jacket, and the third insulating jacket are selected from a group consisting of polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, or nylon.

In still another aspect of the present disclosure, the FFC structure further includes a metallic shield layer. The metallic shield layer is configured to separate the second insulating jacket from the third insulating jacket to form a metallic shield for the plurality of metallic transmission wires.

In yet another aspect of the present disclosure, the FFC structure further includes a ground wire, being parallel to the plurality of metallic transmission wires and arranged at one side of the third insulating jacket, and being enclosed by the second insulating jacket.

According the present disclosure, a flex flat cable (FFC) structure includes a plurality of metallic transmission wires, arranged parallel, comprising one or more power wires and a plurality of signal wires; the power wire being configured to transmit power; the plurality of signal wires being configured to transmit a data signal; the plurality of metallic transmission wires being divided into a plurality of transmission line sets; each of the plurality of transmission line sets comprising two or more metallic transmission wires; a plurality of first insulating jackets, the two or more metallic transmission wires in each of the plurality of the transmission line sets being enclosed by the plurality of first insulating jackets, and the other metallic transmission wires in each of the plurality of the transmission line sets being arranged at one side of the first insulating jacket; a second insulating jacket, enclosing the plurality of transmission sets; an embossment pattern being arranged on an external surface of the second insulating jacket; the second insulating jacket enclosing the plurality of first insulating jackets; the second insulating jacket enclosing the other metallic transmission wires, which are not enclosed by each of the plurality of the transmission line sets, in each of the plurality of the transmission line sets; the embossment pattern comprising a plurality of meander lines in a top-view direction and in an extending direction for the plurality of metallic transmission wires; the plurality of meander lines being not arranged parallel.

In one aspect of the present disclosure, the two first insulating jackets enclosing the two or more metallic transmission wires in each of the plurality of the transmission line sets contact with each other.

In another aspect of the present disclosure, the FFC structure further includes a metallic shield layer wherein the metallic shield layer is configured to separate the second insulating jacket from the first insulating jacket to form a metallic shield for the plurality of metallic transmission wires.

In still another aspect of the present disclosure, materials of the first insulating jacket and the second insulating jacket are selected from a group consisting of polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, or nylon.

According the present disclosure, a flex flat cable (FFC) structure includes: a plurality of metallic transmission wires, arranged parallel, comprising one or more power wires and a plurality of signal wires; the power wire being configured to transmit power; the plurality of signal wires being configured to transmit a data signal; a first insulating jacket, enclosing the plurality of metallic transmission wires; a second insulating jacket, enclosing the first insulating jacket; an embossment pattern being arranged on an external surface of the second insulating jacket; the embossment pattern comprising a plurality of meander lines in a top-view direction and in an extending direction for the plurality of metallic transmission wires; the plurality of meander lines being not arranged parallel.

In one aspect of the present disclosure, the FFC structure further includes a metallic shield layer. The metallic shield layer is configured to separate the second insulating jacket from the first insulating jacket to form a metallic shield for the plurality of metallic transmission wires.

In another aspect of the present disclosure, the FFC structure further includes a ground wire, being parallel to the plurality of metallic transmission wires and enclosed by the second insulating jacket.

In still another aspect of the present disclosure, materials of the first insulating jacket and the second insulating jacket are selected from a group consisting of polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, or nylon.

According the present disclosure, a flex flat cable (FFC) electrical connector fix structure, includes an electrical connector and an FFC structure. The electrical connector includes a housing; a spacer, assembled onto the housing, and comprising a plurality of containing recesses; a printed circuit board (PCB), comprising a plurality of conductive portions and a plurality of connecting portions, and the plurality of conductive portions being electrically connected to the plurality of corresponding connecting portions respectively; a plurality of terminals, one end of the plurality of terminals passing through the containing recess and being connected to the plurality of connecting portions; and a shell, assembled onto the housing. The FFC structure includes: a plurality of metallic transmission wires, arranged parallel, comprising one or more power wires and a plurality of signal wires; the power wire being configured to transmit power; the plurality of signal wires being configured to transmit a data signal; a plurality of first insulating jackets, and each of the plurality of first insulating jackets encloses one of the plurality of metallic transmission wires; a second insulating jacket, surrounding the plurality of first insulating jackets; an embossment pattern being arranged on an external surface of the second insulating jacket; the embossment pattern comprising a plurality of meander lines in a top-view direction and in an extending direction for the plurality of metallic transmission wires; the plurality of meander lines being not arranged parallel. The plurality of metallic transmission wires are connected to the plurality of connecting portions.

The present disclosure is effective in improving transmission loss of a flat cable for high-speed data transmission and enhancing the withstanding current on a power wire by means of broadening the size of a metallic transmission wire as well as replacing the insulating jacket material or foaming an insulating jacket. Compared with the conventional technology, the present disclosure is advantageous of increasing the distance of transmission for a flat cable signal and narrowing the size of a flat cable more easily. In addition, the size of a power wire can be independently changed; that is, the size of a power wire may not be the same. The withstanding current capacity of the power wire can be improved by changing the size of the power wire. Also, an embossment pattern is arranged on the external surface at each side of the insulating jacket. The embossment pattern comprises a plurality of meander lines in a top-view direction and in an extending direction for the plurality of metallic transmission wires. The plurality of meander lines are not arranged parallel. Without broadening the width of the FFC, the surface area of the FFC still extends, the heat dissipation capability of the flexible wiring still enhances, and further the withstanding current capability of the FFC still increases. So, the size of the FFC structure can be narrowed more easily. On the other hand, an FFC electrical connector fix structure is also proposed. The FFC electrical connector fix structure has functions of increasing the distance of transmission for a flat cable signal and narrowing the size of a flat cable more easily.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

For better understanding embodiments of the present disclosure, the following detailed description taken in conjunction with the accompanying drawings is provided. Apparently, the accompanying drawings are merely for some of the embodiments of the present disclosure. Any ordinarily skilled person in the technical field of the present disclosure could still obtain other accompanying drawings without use laborious invention based on the present accompanying drawings.

The following descriptions of all embodiments, with reference to the accompanying drawings, are used to exemplify the present disclosure. Directional terms mentioned in the present disclosure, such as "top", "bottom", "front", "back", "left", "right", "inside", "outside", "side", etc., are only used with reference to the orientation of the accompanying drawings. Therefore, the used directional terms are intended to illustrate, but not to limit, the present disclosure.

Figure 1:
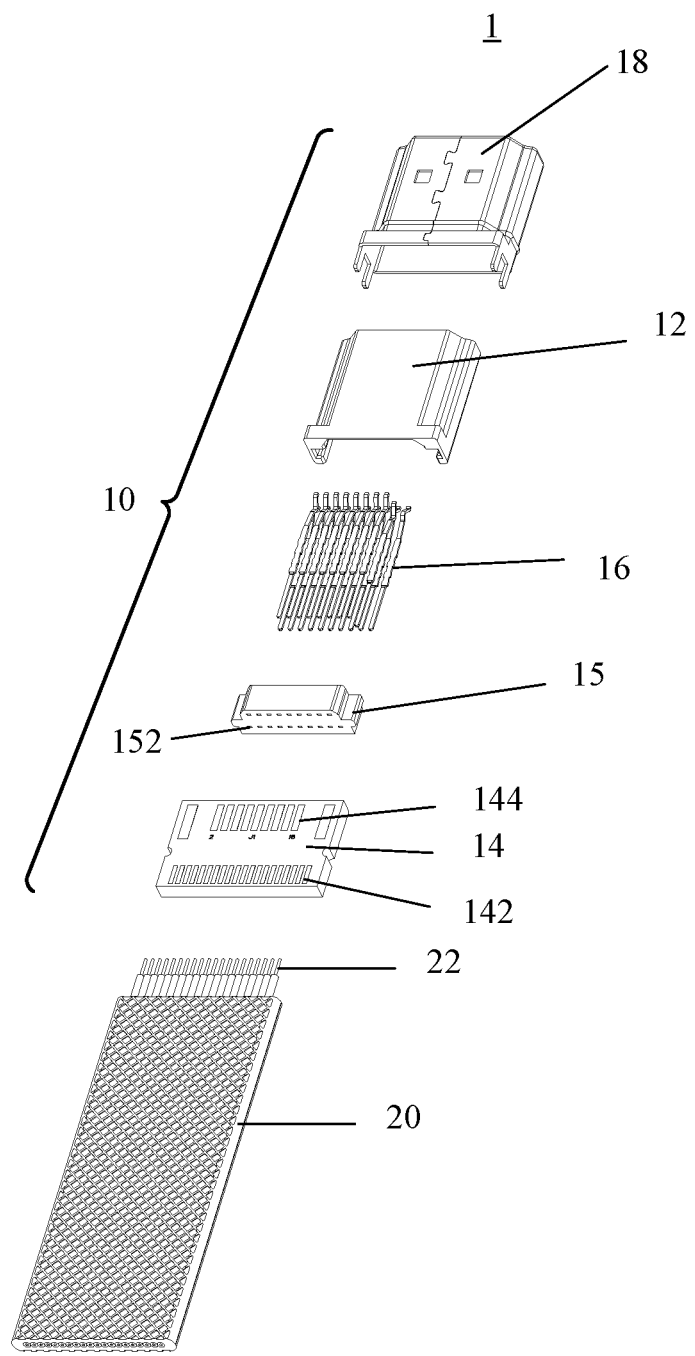
FIG. 1 is an exploded schematic view of a flex flat cable (FFC) electrical connector fix structure according to one preferred embodiment of the present disclosure.

Please refer to FIG. 1. FIG. 1 is an exploded schematic view of a flex flat cable (FFC) electrical connector fix structure 1 according to one preferred embodiment of the present disclosure. The FFC electrical connector fix structure 1 comprises an electrical connector 10 and an FFC structure 20. The FFC structure 20 is plugged onto the electrical connector 10. The electrical connector 10 may be a connector complying with the specifications such as HDMI/USB3.0/USB3.1/Display Port/SATA with a data rate larger than one Gb/s.

The electrical connector 10 comprises a housing 12, a printed circuit board (PCB) 14, a spacer 15, a plurality of terminals 16, and a shell 18. The spacer 15 is assembled onto the housing 12. The spacer 15 comprises a plurality of containing recesses 152. The PCB 14 comprises a plurality of conductive portions 142 and a plurality of connecting portions 144. The plurality of conductive portions 142 are electrically connected to the plurality of connecting portions 144, respectively. One end of the plurality of terminals 16 passes through the containing recess 152 and is connected to the plurality of connecting portions 144. The shell 18 is assembled to the housing 12. The plurality of terminals 16 comprise a plurality of first terminals arranged in a first row and a plurality of second terminals arranged in a second row, and a number of the first terminals is different from a number of the second terminals.

Figure 2:
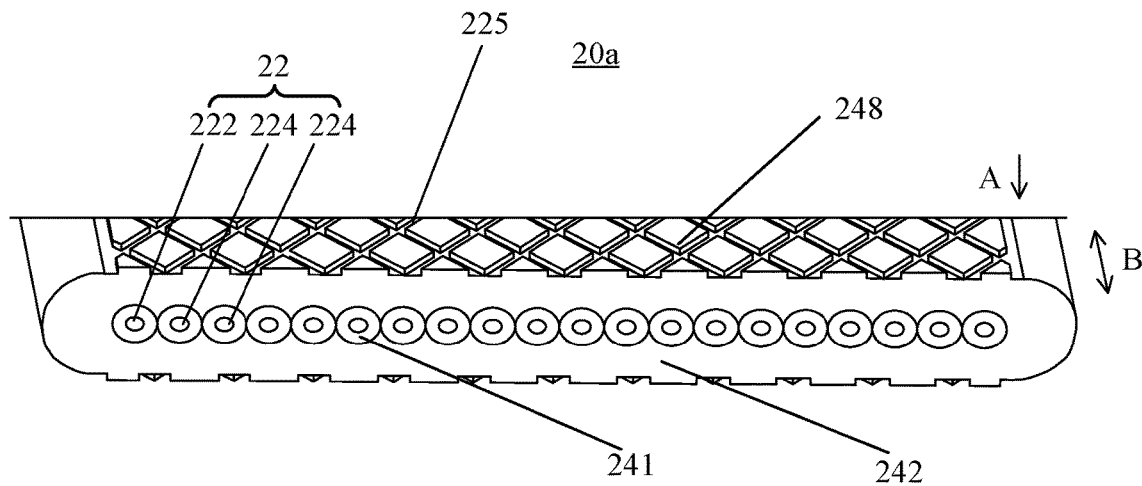
FIG. 2 is a cross-sectional view of a flex flat cable structure according a first embodiment of the present disclosure.

Please refer to FIG. 2. FIG. 2 is a cross-sectional view of a flex flat cable (FFC) structure 20a according a first embodiment of the present disclosure. The FFC structure 20a comprises a plurality of metallic transmission wires 22, a plurality of first insulating jackets 241, and a second insulating jacket 242. The plurality of metallic transmission wires 22 are arranged parallel. The metallic transmission wire 22 comprises one or more power wires 222 and a plurality of signal wires 224. The power wire 222 is used to transmit power, and the signal wire 224 is used to transmit a data signal. The profile of the metallic transmission wire 22 looks like a round. One of the plurality of metallic transmission wires 22 is enclosed by each of the plurality of first insulating jackets 241. The plurality of first insulating jackets 241 are enclosed by the second insulating jacket 242. An embossment pattern 248 is arranged on the external surface at both sides of the second insulating jacket 242. In this embodiment, the metallic transmission wire 22 may comprise a ground wire used to be grounded. The plurality of metallic transmission wires 22 in the FFC structure 20a protrude the second insulating jacket 242 and the first insulating jacket 241. When the FFC structure 20a is plugged onto the electrical connector 10, the protruded metallic transmission wire 22 may touch the conductive portion 142 which the PCB 14 corresponds to. The embossment pattern 248 may be a pattern of a plurality of parallel lines or a plurality of curves or a pattern having cells, each cell shaped as a round, an oval, a triangle, a square, a diamond, a hexagon, etc. The embossment pattern 248 may also be an irregularly arranged pattern or a plurality of consecutive bumps. Preferably, the embossment pattern 248 is arranged on the external surface of the second insulating jacket 242; the embossment pattern 248 comprises a plurality of meander lines 225 in a top-view direction A and in an extending direction B for the plurality of metallic transmission wires 22. The plurality of meander lines 225 are not arranged parallel and formed on recesses or protrusions arranged on the external surface of the second insulating jacket 242. Without broadening the width of the FFC, the surface area of the FFC structure 20a still extends, the heat dissipation capability of the flexible wiring still enhances, and further the withstanding current capability of the FFC still increases. So, the size of the FFC structure 20a can be narrowed more easily. The embossment pattern 248 is formed on the external surface of the second insulating jacket 242 after being compressed in an automation compression device directly.

Figure 3:
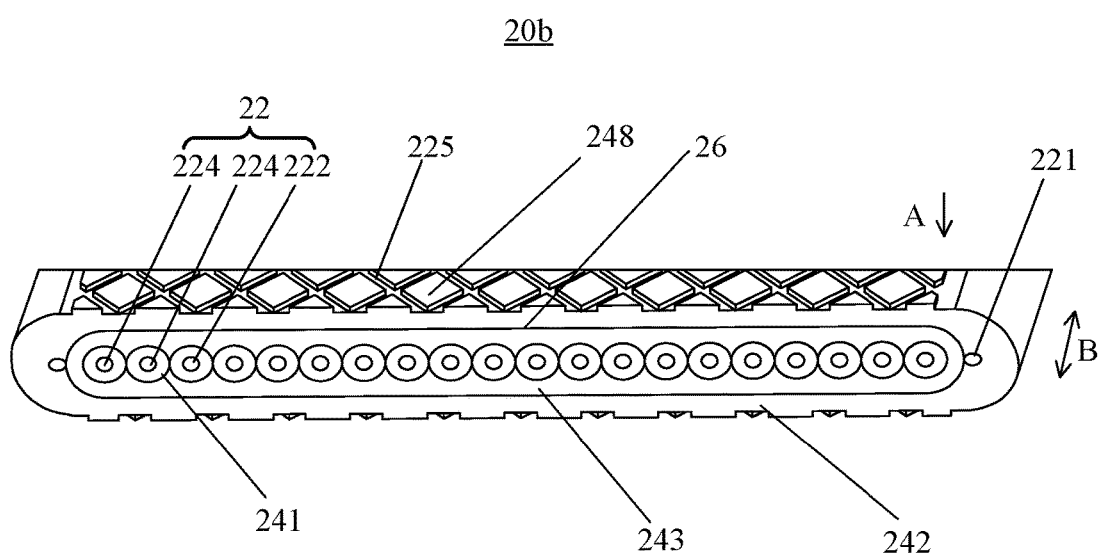
FIG. 3 is a cross-sectional view of a flex flat cable structure according a second embodiment of the present disclosure.

Material of the first insulating jacket 241 is different from that of the second insulating jacket 242. Preferably, the first insulating jacket 241 and the second insulating jacket 242 may be insulating materials with highly thermal resistance such as polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, and nylon. The metallic transmission wire 22 may be a highly thin, flat tinned copper wire. Please refer to FIG. 3. FIG. 3 is a cross-sectional view of a flex flat cable (FFC) structure 20b according a second embodiment of the present disclosure. The FFC structure 20b comprises a plurality of metallic transmission wires 22, a plurality of first insulating jackets 241, a second insulating jacket 242, a third insulating jacket 243, and a metallic shield layer 26. The plurality of metallic transmission wires 22 are arranged parallel. The metallic transmission wire 22 comprises one or more power wires 222 and a plurality of signal wires 224. The power wire 222 is used to transmit power, and the signal wire 224 is used to transmit a data signal. The profile of the metallic transmission wire 22 looks like a round. One of the plurality of metallic transmission wires 22 is enclosed by each of the plurality of first insulating jackets 241. The plurality of first insulating jackets 241 are enclosed by the third insulating jacket 243, and the third insulating jacket 243 is enclosed by the second insulating jacket 242. The plurality of first insulating jackets 241 are surrounded by the second insulating jacket 242. An embossment pattern 248 is arranged on the external surface at both sides of the second insulating jacket 242. In this embodiment, the ground wire 221, used to be grounded, and the plurality of metallic transmission wires 22 are arranged parallel and at one side of the third insulating jacket 243. The ground wire 221 is enclosed by the second insulating jacket 242. The metallic shield layer 26 is used to separate the second insulating jacket 242 from the third insulating jacket 243 to form a metallic shield for the metallic transmission wire 22. The ground wire 221 is electrically connected to the metallic shield layer 26. The metallic shield layer 26 may be either a metallic grid or a metallic thin sheet. The plurality of metallic transmission wires 22 in the FFC structure 20b protrude the second insulating jacket 242 and the first insulating jacket 241. When the FFC structure 20b is plugged onto the electrical connector 10, the protruded metallic transmission wire 22 may touch the conductive portion 142 which the PCB 14 corresponds to. The embossment pattern 248 may be a pattern of a plurality of parallel lines or a plurality of curves or a pattern having cells, each cell shaped as a round, an oval, a triangle, a square, a diamond, a hexagon, etc. The embossment pattern 248 may also be an irregularly arranged pattern or a plurality of consecutive bumps. Preferably, the embossment pattern 248 is arranged on the external surface of the second insulating jacket 242; the embossment pattern 248 comprises a plurality of meander lines 225 in a top-view direction A and in an extending direction B for the plurality of metallic transmission wires 22. The plurality of meander lines 225 are not arranged parallel. The plurality of meander lines 225 are recesses or protrusions arranged on the external surface of the second insulating jacket 242. Without broadening the width of the FFC, the surface area of the FFC structure 20b still extends, the heat dissipation capability of the flexible wiring still enhances, and further the withstanding current capability of the FFC still increases. So, the size of the FFC structure 20b can be narrowed more easily. The embossment pattern 248 is formed on the external surface of the second insulating jacket 242 after being compressed in an automation compression device directly.

Materials of the first insulating jacket 241, the second insulating jacket 242 and the third insulating jacket 243 are different. Preferably, the first insulating jacket 241, the second insulating jacket 242 and the third insulating jacket 243 may be insulating materials with highly thermal resistance such as polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, and nylon. The metallic transmission wire 22 may be a highly thin, flat tinned copper wire.

Figure 4:
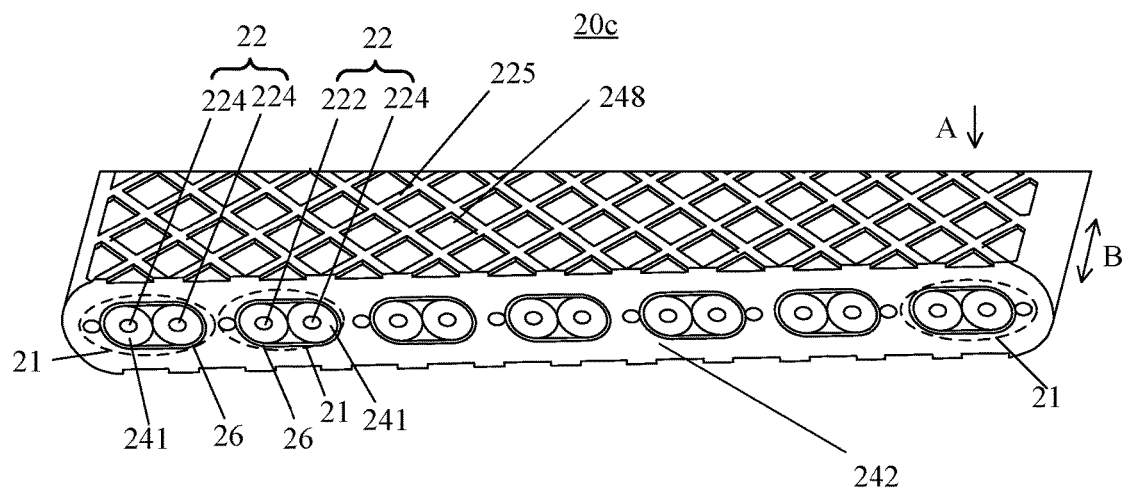
FIG. 4 is a cross-sectional view of a flex flat cable structure according a third embodiment of the present disclosure.

Please refer to FIG. 4. FIG. 4 is a cross-sectional view of a flex flat cable (FFC) structure 20c according a third embodiment of the present disclosure. The FFC structure 20c comprises a plurality of transmission line sets 21, a plurality of first insulating jackets 241, and a second insulating jacket 242. Each of the plurality of the transmission line sets 21 comprises a plurality of metallic transmission wires 22. The plurality of metallic transmission wires 22 are arranged parallel. The metallic transmission wire 22 comprises one or more power wires 222 and a plurality of signal wires 224. The power wire 222 is used to transmit power, and the signal wire 224 is used to transmit a data signal. The profile of the metallic transmission wire 22 looks like a round. The two or more metallic transmission wires 22 in each of the plurality of the transmission line sets 21 are enclosed by the plurality of first insulating jackets 241. The other metallic transmission wires 22 in each of the plurality of the transmission line sets 21 are arranged at one side of the first insulating jacket 241. The plurality of the transmission line sets 21 are enclosed by the second insulating jacket 242. An embossment pattern 248 is arranged on the external surface of the second insulating jacket 242. The plurality of first insulating jackets 241 are enclosed by the second insulating jacket 242. The other metallic transmission wires 22 in each of the plurality of the transmission line sets 21, which are not enclosed by the first insulating jacket 241, are enclosed by the second insulating jacket 242. The two first insulating jackets 241 in the two or more metallic transmission wires 22 in each of the plurality of the transmission line sets 21 contact with each other.

In this embodiment, the ground wire 221 for being grounded is parallel to the plurality of metal transmissions 22. The ground wire 221 is arranged at one side of the first insulating jacket 241. Each of the transmission line sets 21 comprises the two metallic transmission wires 22 and the one ground wire 221. The ground wire 221 is enclosed by the second insulating jacket 242. A metallic shield layer 26 is used to separate the first insulating jacket 241 from the second insulating jacket 242 to form a metallic shield for the plurality of metallic transmission wires 22. The metallic shield layer 26 may be either a metallic grid or a metallic thin sheet. Each of the transmission line sets 21 can also comprise more than three metallic transmission wires 22 and a ground wire 221. The metal transmission 22 for each of the transmission line sets 21 is enclosed by the first insulating jacket 241 and further, the first insulating jacket 241 for each of the transmission line sets 21 is surrounded by the metallic shield layer 26. However, the ground wire 221 in each of the transmission line sets 21 is not enclosed by the first insulating jacket 241 and the metallic shield layer 26.

The plurality of metallic transmission wires 22 in the FFC structure 20c protrude the second insulating jacket 242 and the first insulating jacket 241. When the FFC structure 20c is plugged onto the electrical connector 10, the protruded metallic transmission wire 22 may touch the conductive portion 142 which the PCB 14 corresponds to. The embossment pattern 248 may be a pattern of a plurality of parallel lines or a plurality of curves or a pattern having cells, each cell shaped as a round, an oval, a triangle, a square, a diamond, a hexagon, etc. The embossment pattern 248 may also be an irregularly arranged pattern or a plurality of consecutive bumps. Preferably, the embossment pattern 248 is arranged on the external surface of the second insulating jacket 242; the embossment pattern 248 comprises a plurality of meander lines 225 in a top-view direction A and in an extending direction B for the plurality of metallic transmission wires 22. The plurality of meander lines 225 are not arranged parallel. The plurality of meander lines 225 are recesses or protrusions arranged on the external surface of the second insulating jacket 242. Without broadening the width of the FFC, the surface area of the FFC structure 20c still extends, the heat dissipation capability of the flexible wiring still enhances, and further the withstanding current capability of the FFC still increases. So, the size of the FFC structure 20c can be narrowed more easily. The embossment pattern 248 is formed on the external surface of the second insulating jacket 242 after being compressed in an automation compression device directly.

Materials of the first insulating jacket 241 and the second insulating jacket 242 are different. Preferably, the first insulating jacket 241 and the second insulating jacket 242 may be insulating materials with highly thermal resistance such as polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, and nylon. The metallic transmission wire 22 may be a highly thin, flat tinned copper wire.

Figure 5:
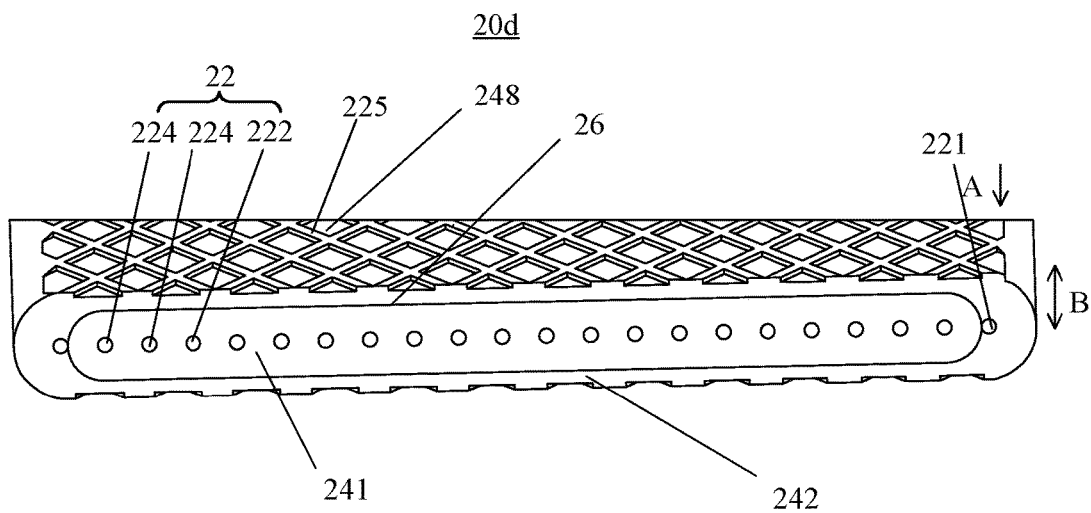
FIG. 5 is a cross-sectional view of a flex flat cable structure according a fourth embodiment of the present disclosure.

Please refer to FIG. 5. FIG. 5 is a cross-sectional view of a flex flat cable (FFC) structure 20d according a fourth embodiment of the present disclosure. The FFC structure 20d comprises a plurality of metallic transmission wires 22, a first insulating jacket 241, and a second insulating jacket 242. The plurality of metallic transmission wires 22 are arranged parallel. The metallic transmission wire 22 comprises one or more power wires 222 and a plurality of signal wires 224. The power wire 222 is used to transmit power, and the signal wire 224 is used to transmit a data signal. The profile of the metallic transmission wire 22 looks like a round. The metallic transmission wire 22 is enclosed by the first insulating jacket 241. The first insulating jacket 241 is surrounded by the second insulating jacket 242. An embossment pattern 248 is arranged on the external surface at both sides of the second insulating jacket 242. In this embodiment, the ground wire 221, used to be grounded, and the plurality of metallic transmission wires 22 are arranged parallel and at one side of the first insulating jacket 241. The ground wire 221 is enclosed by the second insulating jacket 242. The metallic shield layer 26 is used to separate the first insulating jacket 241 from the second insulating jacket 242 to form a metallic shield for the plurality of metallic transmission wires 22. The metallic shield layer 26 may be either a metallic grid or a metallic thin sheet. The plurality of metallic transmission wires 22 in the FFC structure 20d protrude the second insulating jacket 242 and the first insulating jacket 241. When the FFC structure 20d is plugged onto the electrical connector 10, the protruded metallic transmission wire 22 may touch the conductive portion 142 which the PCB 14 corresponds to. The embossment pattern 248 may be a pattern of a plurality of parallel lines or a plurality of curves or a pattern having cells, each cell shaped as a round, an oval, a triangle, a square, a diamond, a hexagon, etc. The embossment pattern 248 may also be an irregularly arranged pattern or a plurality of consecutive bumps. Preferably, the embossment pattern 248 is arranged on the external surface of the second insulating jacket 242; the embossment pattern 248 comprises a plurality of meander lines 225 in a top-view direction A and in an extending direction B for the plurality of metallic transmission wires 22. The plurality of meander lines 225 are not arranged parallel. The plurality of meander lines 225 are recesses or protrusions arranged on the external surface of the second insulating jacket 242. Without broadening the width of the FFC, the surface area of the FFC structure 20d still extends, the heat dissipation capability of the flexible wiring still enhances, and further the withstanding current capability of the FFC still increases. So, the size of the FFC structure 20d can be narrowed more easily. The embossment pattern 248 is formed on the external surface of the second insulating jacket 242 after being compressed in an automation compression device directly.

Materials of the first insulating jacket 241 and the second insulating jacket 242 are different. Preferably, the first insulating jacket 241 and the second insulating jacket 242 may be insulating materials with highly thermal resistance such as polyethylene (PE), polyvinyl chloride (PVC), Thermoplastic Elastomer (TPE), Thermoplastic Polyurethane (TPU), thermoplastic rubber (TPR), Thermoplastic Polyolefin (TPO), Polyurethane (PUR), Polypropylene (PP), Polyolefins (PO), PolyVinyliDene Fluoride (PVDF), Ethylene-chlorotrifluororthylene copolymer (ECTFE), ethylene-tetra-fluoro-ethylene (ETFE), Teflon Fluorinated ethylene propylene (Teflon FEP), Polytetrafluoroethene (PTFE), Teflon, and nylon. The metallic transmission wire 22 may be a highly thin, flat tinned copper wire.

The present disclosure is effective in improving transmission loss of a flat cable for high-speed data transmission and enhancing the withstanding current on a power wire by means of broadening the size of a metallic transmission wire as well as replacing the insulating jacket material or foaming an insulating jacket. Compared with the conventional technology, the present disclosure is advantageous of increasing the distance of transmission for a flat cable signal and narrowing the size of a flat cable more easily. In addition, the size of a power wire can be independently changed; that is, the size of a power wire may not be the same. The withstanding current capacity of the power wire can be improved by changing the size of the power wire. Also, an embossment pattern is arranged on the external surface at each side of the insulating jacket. The embossment pattern comprises a plurality of meander lines in a top-view direction and in an extending direction for the plurality of metallic transmission wires. The plurality of meander lines are not arranged parallel. Without broadening the width of the FFC, the surface area of the FFC still extends, the heat dissipation capability of the flexible wiring still enhances, and further the withstanding current capability of the FFC still increases. So, the size of the FFC structure can be narrowed more easily. On the other hand, an FFC electrical connector fix structure is also proposed. The FFC electrical connector fix structure has functions of increasing the distance of transmission for a flat cable signal and narrowing the size of a flat cable more easily.

Although the present disclosure has been disclosed as preferred embodiments, the foregoing preferred embodiments are not intended to limit the present disclosure. Those of ordinary skill in the art, without departing from the spirit and scope of the present disclosure, can make various kinds of modifications and variations to the present disclosure. Therefore, the scope of the claims of the present disclosure must be defined.

What is claimed is:

1. A flex flat cable (FFC) electrical connector fix structure, comprising:
    an electrical connector, comprising:
        a housing;
        a printed circuit board (PCB), comprising a plurality of conductive portions and a plurality of connecting portions, and the plurality of conductive portions being electrically connected to the plurality of corresponding connecting portions respectively;
        a plurality of terminals, one end of the plurality of terminals correspondingly connected to the plurality of connecting portions, each terminal comprising only one first end and only one second end at two sides, wherein the plurality of terminals comprise a plurality of first terminals arranged in a first row and a plurality of second terminals arranged in a second row, and a number of the first terminals is different from a number of the second terminals; and
        a shell, assembled onto the housing; and an FFC structure, comprising:
   a plurality of metallic transmission wires, arranged parallel, comprising one or more power wires and a plurality of signal wires; the power wire being configured to transmit power; the plurality of signal wires being configured to transmit a data signal;
   a plurality of first insulating jackets, and each of the plurality of first insulating jackets encloses one of the plurality of metallic transmission wires;
   a second insulating jacket, surrounding the plurality of first insulating jackets; an embossment pattern being arranged directly on an external surface of the second insulating jacket; the embossment pattern comprising a plurality of meander lines in a top-view direction and in an extending direction for the plurality of metallic transmission wires; the plurality of meander lines being not arranged parallel; and
   a third insulating jacket, enclosing the plurality of first insulating jackets without any gap and being enclosed by the second insulating jacket and being made in one piece,
   wherein all of the conductive portions are on one surface of the PCB, and the plurality of metallic transmission wires are connected to the plurality of conductive portions,
   wherein the second insulating jacket and the third insulating jacket are made of different materials.

* * * * *